United States Patent [19]

Bilow

[11] 4,098,767

[45] Jul. 4, 1978

[54] COPOLYMERS OF ETHYNYL TERMINATED POLYIMIDES AND DIETHYNYLBENZENE

[75] Inventor: Norman Bilow, Los Angeles, Calif.

[73] Assignee: Hughes Aircraft Company, Culver City, Calif.

[21] Appl. No.: 526,775

[22] Filed: Nov. 25, 1974

[51] Int. Cl.$^2$ .............................................. C08G 73/12
[52] U.S. Cl. ........................... 526/262; 260/33.6 UA; 260/33.6 R; 260/37 N; 528/178; 528/221; 528/333; 526/285; 428/435; 428/474
[58] Field of Search ........ 260/47 UA, 78 UA, 47 CP, 260/78 TF, 78 SC, 37 N, 49, 65, 33.6 R, 33.6 UA; 428/435, 474

[56] References Cited

U.S. PATENT DOCUMENTS

| | | | |
|---|---|---|---|
| 3,845,018 | 10/1974 | Bilow et al. | 260/47 CP |
| 3,864,309 | 2/1975 | Bilow et al. | 260/47 UA |

*Primary Examiner*—Lester L. Lee
*Attorney, Agent, or Firm*—Booker T. Hogan, Jr.; W. H. MacAllister

[57] ABSTRACT

A new class of copolymers obtained via copolymerizing diethynylbenzene with an ethynyl substituted polyimide oligomer has been developed. The copolymers are thermosetting in character and are particularly useful for the fabrication of composite structures such as glass fiber reinforced laminates and molding compounds and graphite fiber reinforced laminates and molding compounds having zero void content.

6 Claims, 4 Drawing Figures

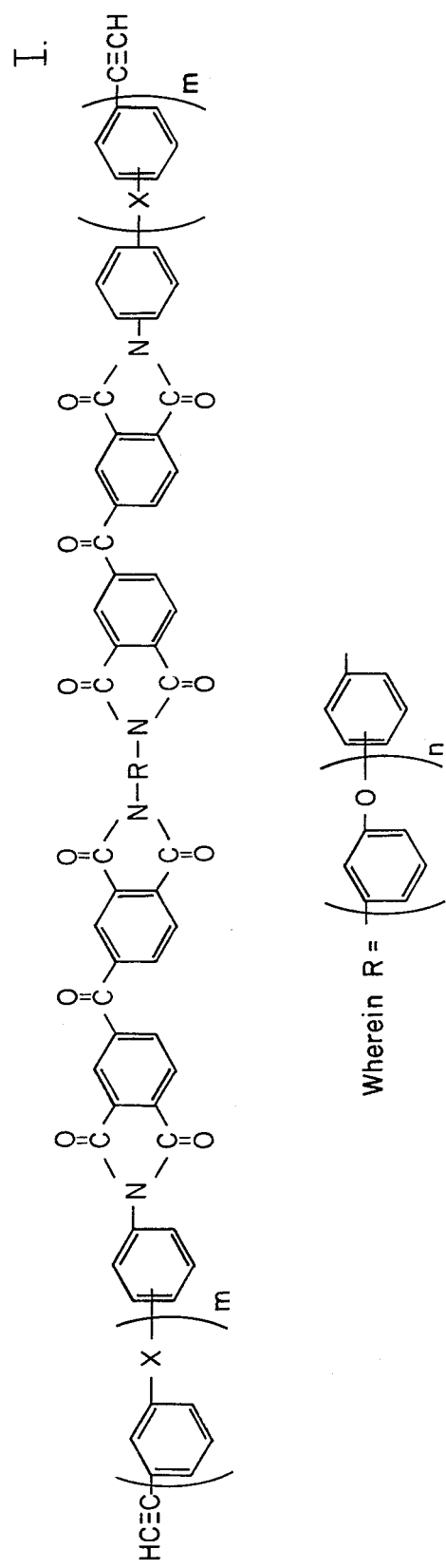
I.

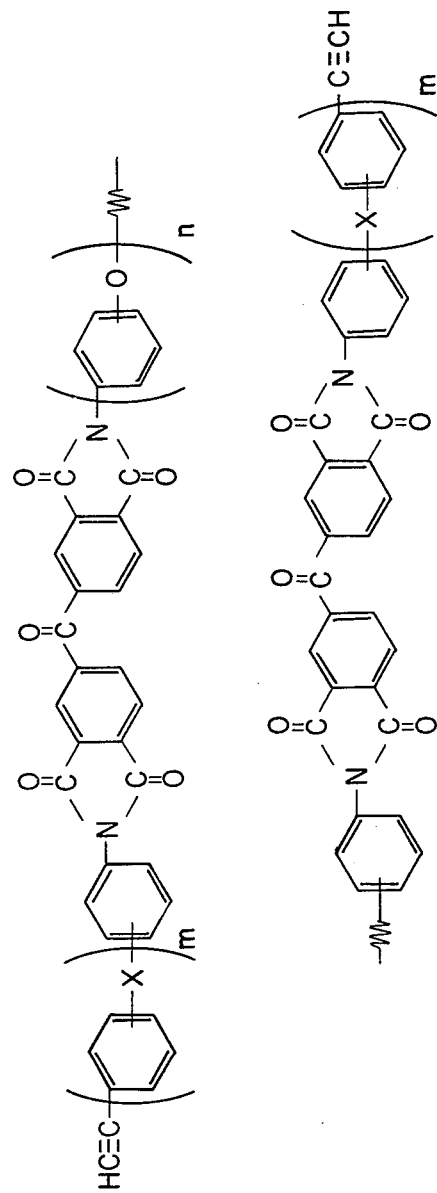

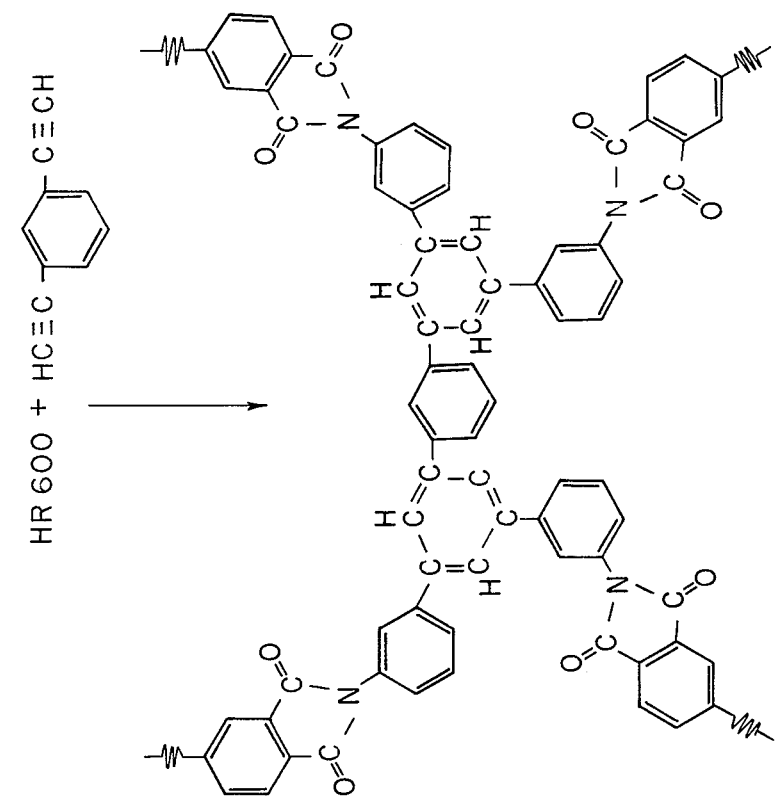

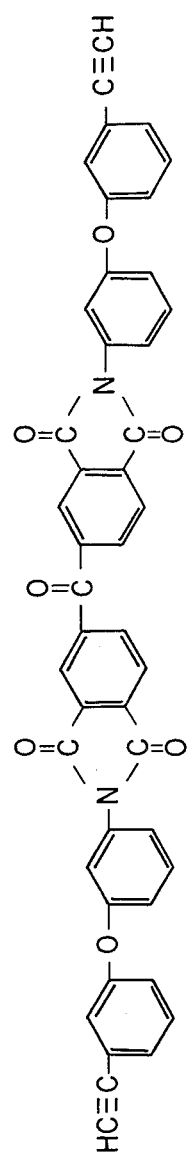

COPOLYMERS OF ETHYNYL TERMINATED POLYIMIDES AND DIETHYNYLBENZENE

The invention herein described was made in the course of or under a contract or subcontract thereunder with the Department of the Air Force.

RELATED APPLICATIONS

In U.S. application Ser. No. 413,473, filed Nov. 6, 1973, by applicant and others and now issued as U.S. Pat. No. 3,845,018, a new class of ethynyl substituted polyimide oligomers which cure by addition is disclosed. The present invention utilizes oligomers of the class disclosed in U.S. Pat. No. 3,845,018 to form copolymers having superior physical and mechanical properties when compared to other polyimide polymers and/or copolymers.

BACKGROUND OF THE INVENTION

1. Field of the Invention

This invention may be classified as one relating to the preparation and formulation of polyimide polymers and copolymers.

2. Description of Prior Art

Composite materials have been used extensively as structural materials in aerospace and other applications where high strength, light weight materials capable of withstanding high temperatures are required. Considerable efforts to extend the thermal stability range, while retaining good structural strength without increasing the weight of such materials has been expanded. Currently, addition polymers such as epoxy resins are used in conjunction with fibers or fabrics to provide essentially void free composite structures which exhibit good structural properties and are light in weight. These structures, however, are limited in their use temperatures to about 150°–175° C because of the thermal stability characteristics of expoxy resins.

There are polyimides such as "P13N" from Ciba Geigy Corporation which give very low void content laminates which are useful at temperatures up to 288° C and there is a polyimide known as Kerimid 601 from Rhodia Corporation (a subsidiary of Rhone Poulenc Co.) which can provide void free laminates which can withstand temperatures of up to 260° C.

Higher temperature laminating resins which cure through addition were unknown prior to the development of the polyimides No. described in the Hughes Aircraft Company U.S. Pat. No. 3,845,018, although there are condensation type polyimides which can be used to produce laminates which withstand temperatures up to 300°–320° C. These resins are limited in their usefulness because the laminates and/or composite materials produced from them exhibit void contents as high as 20–40%. The voids are primarily caused by outgassing which occurs during the condensation mechanism cure.

Applicant herein, in conjunction with Drs. A. J. Landis and L. J. Miller of Hughes Aircraft Company, developed acetylene substituted polyimide oligomers which cure through addition rather than condensation in an attempt to solve the void problem discussed above and retain good thermal resistant properties. Polyimide composites with as little as several tenths to 1% voids were obtained even when molding pressures as low as 200 psi were used. These materials are described in U.S. Pat. No. 3,845,018.

Applicant's present invention constitutes a substantial improvement over the invention described in U.S. Pat. No. 3,845,018 as well as the prior art in that it facilitates the preparation of laminates and composites having high thermal stability, zero void content, and better mechanical properties because of the lower viscosity imparted by the incorporation of the reactive diluent. This is especially true in applications where inpregnation of the oligomer into a highly porous substrate is important.

SUMMARY OF THE INVENTION

Applicant has found that copolymers of diethynylbenzene and other di- or poly ethnyl-substituted diluents and an ethynylated polyimide oligomer such as one having the following general structure

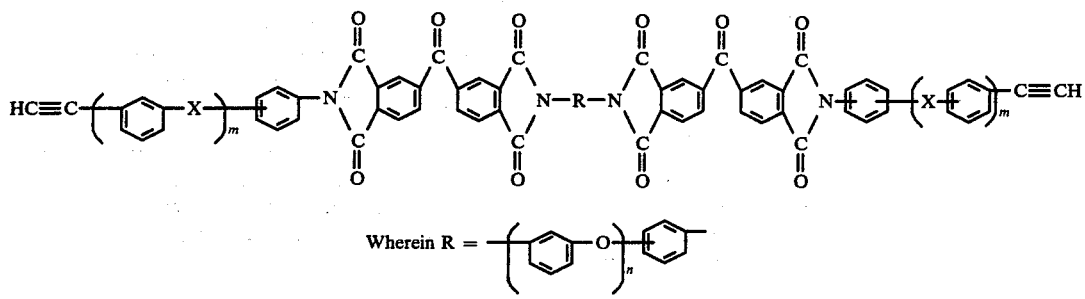

and wherein
$n = 0$ to 5
$m = 0$ to 5 and
$x = O, S, CH_2, CO, SO_2$
can be prepared which, when used to prepared fabricated laminates and other composite structures, result in void free structures having high thermal resistance with excellent mechanical properties.

DESCRIPTION OF THE INVENTION

My invention is a new composition of matter formed via the copolymerization of di- or polyethynyl-substituted diluents such as diethynylbenzene or diethynyldiphenyl ehter with ethynyl substituted polyimide oligomers.

One purpose of the invention is to provide a class of heat resistant copolymers which are thermosetting. A second purpose is to provide a class of heat resistant copolymers which cure through addition rather than through condensation. A third purpose is to provide thermosetting addition polymers which have sufficiently low viscosity to exhibit good melt flow characteristics, good molding properties and good coating characteristics, and a fourth purpose is to provide thermosetting resins which, when used in the fabrication of composite structures, yield cured resin matrices having very low or zero void contents. This latter purpose is very important since composite structures without voids can exhibit the optimum potential properties characteristic of their constituents.

I have discovered that the incorporation of diethynylbenzene and analogous copolymerizable acetylene substituted diluents in a polyimide oligomer such as one having the following structure

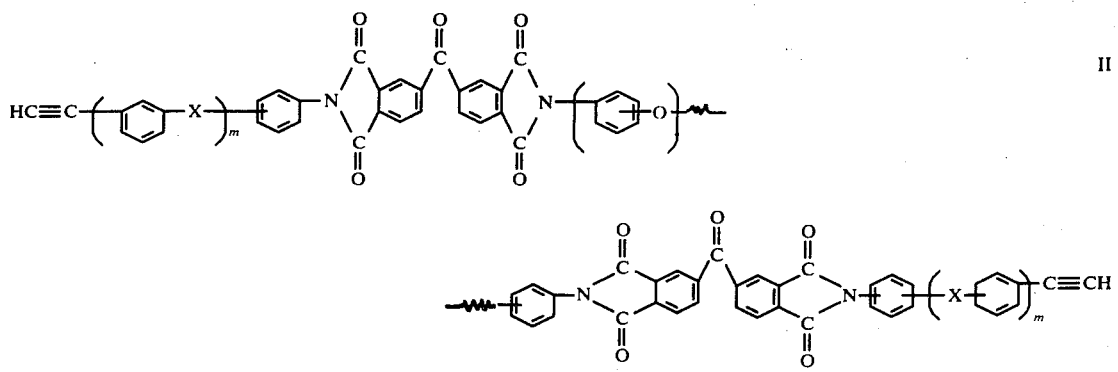

II wherein $x$, $n$, and $m$ are as defined previously, will yield products which allow me to produce laminates with essentially zero void contents, and such laminates are considerably stronger than analogous laminates with larger void contents. In the specific case where $n = 2$ and $m = 0$, the oligomer is one which I call HR600. This is the one which was used in several of my experiments.

The advantage of this invention is largely attributed to the fact that my copolymer was produced from a polyimide oligomer and a liquid compound which could effectively interact with it during cure. The liquid effectively thins out the oligomer when the oligomer is heated and molded and allows the molten oligomer to flow readily into the pores and crevices in fillers and fabric reinforcements. Upon cure, the "thinner" co-reacts with the oligomer and thus it doesn't have to be removed from the resin as an ordinary solvent wouuld have to be. The coreaction between the thinner and the oligomer during cure also yields a product with a higher cross link density than that which the cured oligomer alone would have. With HR600, the copolymers of this invention can be visualized as being formed as follows:

Although the whole molecule is not illustrated, this partial structure adequately illustrates the high degree of complexity of the copolymers. Nuclear magnetic resonance spectroscopy supports the belief that cure occurs when aromatic rings are formed from the acetylene substituted polyimides. However, absolute proof of this theory has not been obtained and it may be that some other types of functional groups such as cyclobutadiene groups or bi-ethynyl groups might also be present to some degree. Nevertheless, the HR600 and diethynylbenzene obviously copolymerize as evidenced by the void free composite structure obtained when a laminate was made.

One copolymer of this invention can be produced by mixing diethynylbenzene with the ethynyl substituted polyimide oligomer. It is important, however, to avoid the use of excess diethynylbenzene since this compound can polymerize explosively. I thus prefer using less than 20% by weight of the diethynylbenzene in the oligomer. It is possible to pre-react these materials by careful heating of the mixtures at temperatures of about 400°–450° F, but prepolymerization is not essential since the oligomer can merely be diluted with the diethynylbenzene and used directly as a molding or laminating resin. Various other di- or polyethynyl-substituted diluents could also function in this capacity.

A specific example of how my copolymer may be prepared within the matrix of a laminate is described below.

EXAMPLE I

A section of glass cloth (181E glass having an A-1100 finish) was cut to 10 × 18 inches and then weighed. A

HR600 + HC≡C—⌬—C≡CH

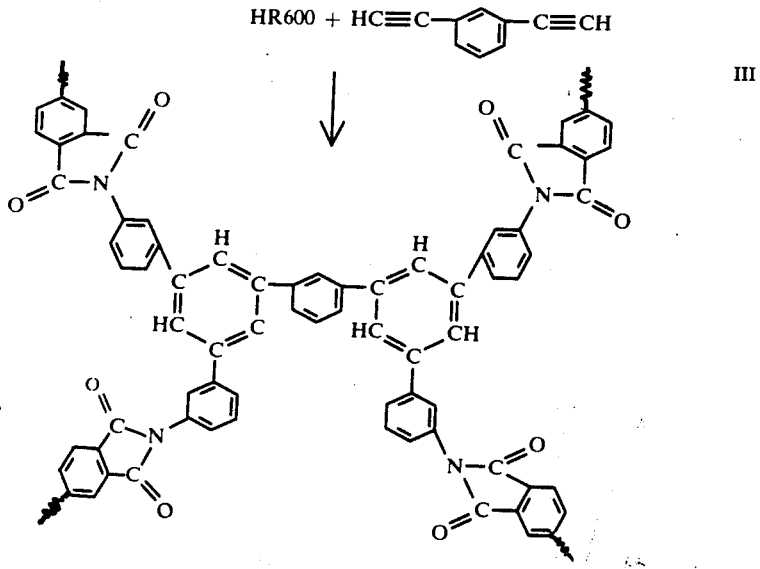

III quantity of powered HR600 was then weighed out sufficient to provide a 40% resin weight pick up on the fabric. To this amount of resin was added N-methylpyrrolidone, producing a coating varnish after heating the mixture to 325° F to promote dissolution. The glass fabric was dipped into, and slowly pulled through the hot solution in a dip tank at 350° F. The coating process was repeated until all of the varnish was consumed; however, the fabric was air dried for 30 minutes followed by 15 minutes at 350° F. after each coating. Subsequently the coated fabric was dried for 16 hours under vacuum at 160° F. Next it was cut in half, and 1 half was made into a 6 ply laminate by molding it at 485° F and 200 p.s.i. using a contact time of 90 seconds and a cure time of 2 hours.

The other half of the fabric was brushed with a solution of diethynylbenzene (DEB) in hexane (20 ml.). Sufficient DEB was used so that its weight was equal to 10% of the HR600 resin weight. After a 5 minute air dry the coated "prepreg" fabric was placed into a "Teflon" film bag and the bag was sealed and stored for 7 days. After aging the fabric, a laminate was molded at 485° F and 200 p.s.i. using a contact time of 90 seconds and a cure time of 2 hours.

A comparison of the properties of these two laminates showed the following:

| Property | Without DEB | With DEB |
|---|---|---|
| Thickness | 0.050" | 0.045" |
| Density | 1.91 g/cc | 2.11 g/cc |
| Resin Content | 23.0% | 24.1% |
| Void Content | 5.0% | 0% |

Void content calculations were based on a density of 1.40 g/cc for the HR600 resin and 2.51 g/cc for the glass fabric.

The difference between the two laminates was startling since under the specific molding conditions used the laminate without DEB had 5% voids and the laminate with DEB had 0% voids. Other molding conditions would show a different differential.

The advantage of adding DEB was even more evident when a comparison was made between the physical properties of the DEB containing laminate and several other HR600/181E glass laminates that had been fabricated earlier and tested previously. Results of this comparison are shown below

EXAMPLE II

A chloroform solution of HR700 oligomer (whose structure is shown below) was mixed with sufficient diethynylbenzene (DEB)

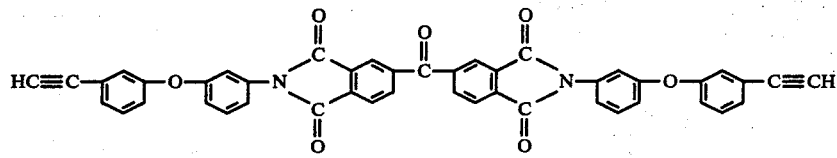

such that the oligomer DEB weight ratio was 10 to 1 and the mixture was poured into a small crystallizing dish. After the chloroform had evaporated, the oligomer mixture was pulverized and molded with heating at a pressure of 200 p.s.i. Microscopic examination of the cured resin showed no evidence of porosity.

Having described my invention with sufficient particularity so as to let one know what is intended, the scope of my claims may now be understood as follows.

What is claimed is:

1. Composite materials prepared from copolymers comprised of an ethynyl-substituted polyimide oligomer comprised of the following general structure

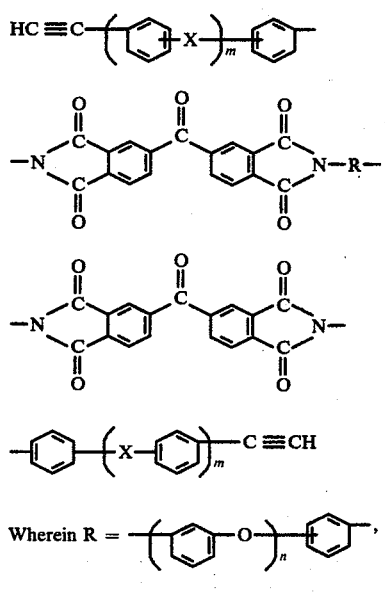

$n = 0$ to 5,
$m = 0$ to 5, and
$x = O, S, CH_2, CO, SO_2$
coreacted with less than 20% of a di- or polyethynyl-substituted diluent and a reinforcing fabric, filler or chopped fiber.

2. A new class of copolymers comprised of less than 20% by weight of a di- or polyethynyl-substituted dilu-

| Laminate No. | Void Content | Flexural Strength p.s.i. at 550° F. | Flexural Modulus, p.s.i. at 550° F. |
|---|---|---|---|
| G 1996-31 (no DEB) | 3.5 | $26.5 \times 10^3$ | $1.25 \times 10^6$ |
| G 1996-22B (no DEB) | 1.4 | $28.5 \times 10^3$ | $1.95 \times 10^6$ |
| With DEB/HR600 | 0 | $34.5 \times 10^3$ | $2.40 \times 10^6$ | ent coreacted with an ethynyl substituted polyimide oligomer comprised of the following general structure

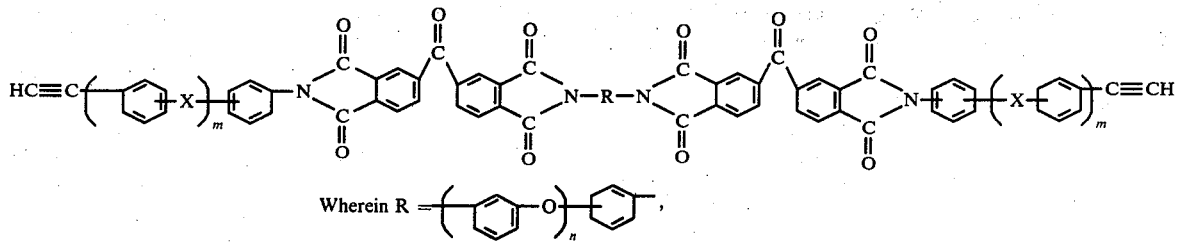

$n = 0\text{--}5$,
$m = 0\text{--}5$, and
$x = O, S, CH_2, CO, SO_2$.

3. The copolymer of claim 2 wherein "$n$" is 2, "$m$" is 0, and said diluent is diethynylbenzene.

4. The copolymer of claim 2 wherein "$n$" is 2, "$m$" is 0, and said diluent is diethynyldiphenyl ether.

5. The material of claim 1 wherein "$n$" is 2, "$m$" is 0, and said diluent is diethynylbenzene.

6. The material of claim 1 wherein "$n$" is 2, "$m$" is 0, and said diluent is diethynyldiphenyl ether.

* * * * *